United States Patent [19]

Gray

[11] Patent Number: 4,652,877

[45] Date of Patent: Mar. 24, 1987

[54] METER DATA GATHERING AND TRANSMISSION SYSTEM

[75] Inventor: Bruce E. Gray, Murraysville, Pa.

[73] Assignee: Rockwell International Corporation, Pittsburgh, Pa.

[21] Appl. No.: 510,753

[22] Filed: Jul. 1, 1983

[51] Int. Cl.⁴ .................. G08B 23/00; G08C 15/06; G08C 19/06; G01R 19/00

[52] U.S. Cl. .................... 340/870.02; 340/870.03; 364/483; 340/870.31

[58] Field of Search ............... 340/870.02, 870.03, 340/870.09, 870.11, 870.13, 825.2, 825.21; 371/69; 364/483; 375/7

[56] References Cited

U.S. PATENT DOCUMENTS

| | | |
|---|---|---|
| 1,897,657 | 2/1933 | Yates. |
| 2,039,405 | 5/1936 | Green et al.. |
| 2,403,889 | 7/1946 | Di Toro. |
| 2,908,894 | 10/1959 | Kienast. |
| 3,054,095 | 9/1962 | Hellar. |
| 3,264,633 | 12/1966 | Hellar. |
| 3,274,584 | 9/1966 | Morgan et al.. |
| 3,290,675 | 12/1966 | Neild. |
| 3,344,408 | 9/1967 | Singer et al.. |
| 3,417,390 | 12/1968 | Turtle. |
| 3,441,923 | 4/1969 | King. |
| 3,478,342 | 11/1969 | Alldritt et al.. |
| 3,518,652 | 6/1970 | Dransfield et al.. |
| 3,531,771 | 9/1970 | Jaxheimer et al.. |
| 3,569,833 | 3/1971 | Milton. |
| 3,614,318 | 10/1971 | Klose. |
| 3,656,112 | 4/1972 | Paull. |
| 3,657,717 | 4/1972 | Glantschnig et al.. |
| 3,662,758 | 5/1972 | Glover. |
| 3,676,876 | 7/1972 | Dransfield et al.. |
| 3,689,885 | 9/1972 | Kaplan et al.. |
| 3,691,547 | 9/1972 | Liqscomb. |
| 3,697,970 | 10/1972 | Jaxheimer. |
| 3,706,086 | 12/1972 | Farnsworth. |
| 3,748,654 | 7/1973 | Sutherland. |
| 3,750,122 | 7/1973 | Maeda. |
| 3,758,845 | 9/1973 | MacKelvie ............... 340/870.39 |
| 3,781,792 | 12/1973 | Birkin ...................... 371/69 |
| 3,806,904 | 4/1974 | Weinberger ............... 340/870.24 |
| 3,809,866 | 5/1974 | Scoville. |
| 3,820,075 | 6/1974 | Ebner. |
| 3,840,866 | 10/1974 | St. Clair ................... 340/870.22 |
| 3,842,206 | 10/1974 | Barsellotti et al.. |
| 3,852,726 | 12/1974 | Romanelli. |
| 3,872,455 | 3/1974 | Fuller et al.. |
| 3,914,757 | 10/1974 | Finlay, Jr. et al.. |
| 3,961,317 | 6/1976 | Marcetteau De Brem et al.. |
| 4,085,287 | 4/1978 | Kullmann ................ 340/870.02 |
| 4,119,948 | 10/1978 | Ward et al.. |
| 4,132,981 | 1/1979 | White ....................... 340/870.02 |
| 4,133,034 | 1/1979 | Etter. |
| 4,150,358 | 4/1979 | Aviander ................. 340/870.31 |
| 4,155,074 | 9/1979 | Abe. |
| 4,156,927 | 9/1979 | McElroy et al.. |
| 4,169,290 | 9/1979 | Reed. |
| 4,187,854 | 2/1980 | Hepp et al.. |
| 4,201,887 | 5/1980 | Burns. |
| 4,206,449 | 6/1980 | Galvin ..................... 340/870.13 |
| 4,208,653 | 6/1980 | Abe ......................... 340/870.22 |
| 4,218,737 | 8/1980 | Buscher et al.. |
| 4,223,679 | 9/1980 | Schulman et al.. |
| 4,223,830 | 9/1980 | Walton. |
| 4,236,068 | 9/1980 | Walton. |
| 4,237,900 | 12/1980 | Schulman et al.. |
| 4,240,030 | 12/1980 | Bateman et al.. |
| 4,241,237 | 12/1980 | Paraskevakos et al.. |
| 4,254,472 | 3/1981 | Juengel et al.. |
| 4,276,644 | 6/1981 | DeWitte. |
| 4,283,772 | 8/1981 | Johnston. |
| 4,301,508 | 11/1981 | Anderson et al.. |
| 4,316,262 | 2/1982 | Mizuta et al.. |
| 4,333,072 | 6/1982 | Beigel. |
| 4,338,601 | 7/1982 | Nance-Kivell. |
| 4,345,146 | 8/1982 | Storey et al.. |
| 4,349,821 | 9/1982 | Vansca. |
| 4,353,064 | 10/1982 | Stamm. |
| 4,354,190 | 10/1982 | Reschovsky ............. 340/870.39 |
| 4,355,361 | 10/1982 | Riggs et al.. |
| 4,360,918 | 11/1982 | Ruhnau .................... 371/69 |
| 4,361,838 | 11/1982 | Mizuta. |
| 4,361,877 | 11/1982 | Dyer et al.. |
| 4,384,288 | 5/1983 | Walton. |
| 4,388,524 | 6/1983 | Walton. |
| 4,399,437 | 8/1983 | Falck et al.. |
| 4,439,764 | 3/1984 | York ........................ 340/870.02 |
| 4,463,354 | 7/1984 | Sears ........................ 340/870.05 |
| 4,473,825 | 9/1984 | Walton. |
| 4,480,178 | 10/1984 | Miller et al.. |
| 4,509,093 | 2/1985 | Stellberger. |
| 4,510,495 | 4/1985 | Sigrimis et al.. |
| 4,517,563 | 5/1985 | Diamant et al.. |
| 4,532,416 | 7/1985 | Berstein. |

FOREIGN PATENT DOCUMENTS 2293373 12/1979 Fed. Rep. of Germany.
55-91251 7/1980 Japan.
1253826 11/1971 United Kingdom.

OTHER PUBLICATIONS

Holcomb et al., "Medical and Biological Engineering", vol. 7, No. 5, Sep. 1969, pp. 493–499 (First Article).
Holcomb et al., "21st ACEMB", Houston, Texas, No. 18–21, 1968, p. 22 a 1 (Second Article).

*Primary Examiner*—John W. Caldwell, Sr.
*Assistant Examiner*—Ralph Smith
*Attorney, Agent, or Firm*—Richard Speer; Albert G. Marriott; R. Lewis Gable

[57] ABSTRACT

A utility data gathering system is disclosed as comprising a register including a series of index members coupled to a meter mechanism. Each index member includes a plurality of contacts and a switch arm moveable with its index member. The meter mechanism is responsive to utility consumption for moving the index members to positions indicative of the utility consumed, whereby each switch arm completes in normal operation a circuit with just one of its plurality of contacts dependent upon the position of its index member. A digital computer is programmed for performing first and second scans of each contact of each index member to obtain corresponding first and second sets of data indicative of a completed circuit through the switch arm and contacts of each index member. The completed circuit data obtained from each of the first and second scans are compared and if the circuit data of the first and second scans are different, an alarm manifestation is generated.

23 Claims, 8 Drawing Figures

METER DATA GATHERING AND TRANSMISSION SYSTEM

FIELD OF THE INVENTION

This invention relates to meter data gathering systems and, in particular, to such systems that employ a mechanical-type meter having a plurality of wheels, the positions of which indicate successive magnitudes, e.g., units, tens, hundreds, thousands, of a utility to be measured.

DESCRIPTION OF THE PRIOR ART

It has been a long-standing problem of utility companies dealing with the distribution of such utilities as water, gas or electricity, for example, to obtain an indication of the utility consumption by each of its customers, so that customers may be accurately billed for their consumption. It has been a typical practice for the utility company to employ "meter readers" to visit each customer location or home and take the reading, by visually observing the meter and recording in tabulated form a hand-written record of the utility consumption and the corresponding customer. Such a method is very time-consuming and, thus, costly in that the meter reader must typically gain access to the interior of the customer's house, wherein the meter is located, and on many occasions will find the customer absent, thus requiring repeated return visits to secure the necessary reading.

U.S. Pat. No. 3,806,904 of Weinberger et al., assigned to the assignee of this invention, discloses a utility meter, illustratively a water meter, for measuring the flow of water to incrementally record upon a coupled, mechanical-type register, an indication of the amount of water consumed by the customer. In turn, an electrical signal is derived from the register upon coupling to a portable interrogation unit and is applied to an external receptacle, typically located upon the exterior of the customer's home or place of business, whereby the portable interrogation unit carried by the meter reader to the customer's location, is coupled thereto to derive a readout signal indicative of the water consumption by the customer.

The mechanical register associated with the water meter, as described in the Weinberger et al. patent, comprises a series of wheels, the positions of which indicate successive magnitudes, e.g., units, tens, hundreds, thousands, of the quantity of water consumed. For example, the water meter incrementally moves the register for each 100 or 1,000 gallons of water that the customer has consumed. Each of the series of wheels has 10 digital positions and causes a step-wise unit progression of the following wheel, when the preceding wheel has itself completed a cycle or revolution of movement. In an illustrative example wherein the series of wheels represents a value of the measured parameter of "5432", the movement of the first or "units" wheel from the value "9" to the value "0" causes the second or "tens" wheel to make a step-wise change from "3" to "4" and similarly, the movement of the second wheel from "9" to "0" will progress the hundreds or third wheel from "4" to "5". A resistance ladder is associated with each wheel to provide an electrical signal indicative of the position of its wheel and, thus, the water consumed. Selected connections are made from the plurality of resistance ladders to an external receptacle disposed upon the exterior of the customer's home or place of business, whereby the utility reader may readily gain access to the mechanical register. In addition, a circuit-board or wiring matrix is disposed, illustratively within the external receptacle, that is so configured or wired to uniquely identify the customer.

In order to obtain a meter reading, the meter reader gains access to the external receptacle by coupling a connector in the form of a gun through a removable face plate, whereby the interrogator gun including contacts, is coupled with contacts within the receptacle so that an electrical connection is made between the portable interrogation unit and the resistance ladders associated with the utility meter. Upon insertion of the interrogator gun, the control logic associated with the portable interrogation unit, sequentially reads out or obtains an encoded readout signal from the resistance ladder associated with each of the wheels of the mechanical register, and a six-digit customer identification signal from the wiring matrix.

U.S. Pat. No. 3,840,866 of St. Claire et al. discloses a meter reading system employing a meter having a mechanical register including a set of four dials or wheels. Each dial has 10 contacts disposed about its periphery and a wiper rotatably disposed to mate sequentially with one contact at a time. The wiper is rotated to a position dependent upon the flow of a utility through the meter. The positions of the four wipers of the four dials indicate the quantity of the metered utility. One of a first set of conductors is connected to each wiper, and corresponding of the ten contacts of each dial are connected to a common conductor of a second set of ten conductors. Thus, the position of the wiper arm of each disc may be determined in the following fashion. A signal is selectively applied to one of the first set of conductors at a time, to establish a circuit through the wiper to a corresponding one of the ten conductors of the second set; thus, the appearance of the signal on one of the ten conductors indicates the position of the wiper arm of the corresponding dial. After the wiper arm of one dial has been so determined, the signal is placed upon a second conductor of the first set to determine the position of its wiper. The second set of ten conductors is coupled to a complex of diodes that acts as a decimal to binary decoder, whereby selected signals appear upon its four output terminals indicative of that contact through which a circuit is completed by the wiper arm and, thus, the position of the wiper arm.

St. Claire et al. discloses that the above described meter and set of four encoding dials are part of a transmitter that is stationarily disposed. A portable receiver may be carried by a meter reader to each of the stationary transmitters to read out an indication of the metered utility. In particular, the complex of diodes selectively energizes four radiant energy transmission means in the form of either an electromagnet or a light source. A portable interrogator unit is a carried to the transmitter and includes a similarly disposed array of receiving elements, i.e., either a set of reed switches or photo cells, that are aligned to detect the radiant energy as generated by each of the corresponding radiant energy transmission means of the transmitter. The reed switches are illustratively connected to a binary to numeric converter that converts the binary data indicative of the utility consumed to a corresponding digital display. In operation, the portable interrogator unit is aligned with the transmitter such that the arrayed sets of electromagnetic relays and reed switches are coupled with each other and, then, a switch is closed in the portable unit to energize a starter electromagnet to close a related switch within the transmitter, whereby a transmitter battery is connected in circuit to energize the elements of the transmitter. Upon completion of the readout, the transmitter battery is removed from circuit and the transmitter is de-energized.

U.S. Pat. No. 4,085,287 of Kullmann et al. discloses an interrogation circuit or unit that is coupled via a pin plug and corresponding socket receptacle to a transmitter associated with a utility meter. The meter is associated with four decade switches similar to those of the St. Claire et al. patent '866. The four switches represent the 0, 10, 100 and 1000 units of cubic feet of water as measured by the meter. Upon coupling of the pin plug and socket receptacle, the interrogation unit is actuated to transmit a clock/power signal via an input channel formed through the coupled pin plug and socket to the transmitter associated with the meter. The clock/power signal is rectified to charge a capacitor, whereby a DC voltage is developed to energize the circuit elements of the transmitter. In addition, the clock signals are used, not only to scan the four switches, but also to time the transmission of a digital signal from the transmitter to the interrogation unit in synchronism with the input clock signal. The output of the transmitter is developed from a code generator logic circuit that applies its output along an output channel within the coupled pin plug and socket to the interrogation unit, the output channel being separate from the input channel. Each of the input and output channels is formed by a male/female type of connection within the coupled pin plug and socket, as is well known in the art. The output or return signal is in the form of a train of 16 characters, each comprised of four bits. Four of the 16 characters are used to provide data indicative of the position of the switches. The output as obtained from each switch is in the form of decimal binary data and is converted to binary coded signals to be, in turn, transmitted in a synchronous, serial fashion by the generator code logic. The ten other remaining characters of the output signal of the transmitter relate to a unique code identifying the particular meter. The unique code is provided by a hard wire circuit dependent upon the selected interconnection of rows and columns of conductors.

The Kullmann et al. patent '287 also suggests that upon coupling of the pin plug and socket receptacle, that the power/clock signal is applied to a character counter and a BCD to decimal converter that selectively energizes one of ten input conductors. The four of the ten input conductors are respectively coupled to the wiper arms of the decade switches. Each decade switch has ten output contacts. The ten output contacts of each of the four decade switches are coupled in parallel to a set of ten output conductors. Thus, as each of the four input conductors is energized, a corresponding wiper arm of a decade switch is energized to apply a voltage to one of its ten output contacts, indicating the position of that wiper arm. By sequentially applying an energizing signal to each of the wiper arms, four sets of data indicating respectively the positions of the four arms and, thus, the 0, 10, 100 and 1000 units of cubic feet of water is provided. Six of the ten input conductors are coupled to the coded wire circuit and are energized in sequence to output signals on selected of the output conductors to thereby indicate the particular meter or customer being read. In turn, the ten output lines are coupled to a decimal to BCD converter, whereby the decimal input data is converted to binary coded decimal data appearing in parallel on its four output lines. The code generator logic converts the input parallel data to the aforedescribed return signal. The output is transmitted serially in synchronism with the input power/clock signal, each bit transmitted out in response to the detection of a pulse of the inputted clock/power signal.

U.K. Pat. No. 1,253,826 of Lapsley discloses a remote meter reading system employing a mechanical meter of the type employed above having a set of five index members or wheels, where successive wheels represent successive orders of a numerical value of the metered utility. Each wheel of the set has ten electrical contacts. Corresponding of the ten contacts of each of the four wheels are connected to ten output conductors forming a cable connected to a socket disposed on the outside of the consumer's premises. In order to read the meter, a portable interrogator or recording unit is connected by a plug to the outside socket. Upon being coupled to the meter, the interrogator unit is energized and, in particular, its oscillator generates a series of clock pulses to control an interrogation sequence unit which outputs ten sequential pulses on corresponding input leads, whereby a current is applied to an indexing or wiper arm of each of the index wheels in sequence. The wheel contacts are coupled, as explained above, by the output conductors through the plug and socket connection to a decimal-to-binary encoder of the interrogator unit. The binary output of the encoder is recorded upon a suitable memory such as a recording tape. A second group of output leads are permanently connected to individual ones of the first mentioned group output leads. The second group of output leads are sampled in a predetermined sequence to detect a serial code as determined by the connection of the first and second groups of leads; this serial code identifies the particular lead and its installation. Lapsley discloses that the meter index and identification circuits are scanned a second time, in a manner similar to that described above, in order to ensure that the meter data is accurately recorded on the tape. In addition, the Lapsley patent '826 is concerned with the ambiguity in the meter output reading that would arise if there is a change over in the position of the wiper arm while the output conductors are being read. In particular, the index wheels are supported on a rotary shaft and are axially disposed along the shaft by a solenoid whereby the plurality of contacts on each index wheel are mated with a corresponding second set of contacts when it is desired to read out a particular wheel. An indexing mechanism is used to advance or retard the position of an index wheel disposed in a position intermediate of two adjacent contacts. The index mechanism includes a stationary wheel with a first set of teeth and a second wheel affixed to the rotatable shaft. When it is desired to make a reading of each of the index wheels, the second wheel is disposed by the solenoid into a mating relation with the stationarily disposed wheel, whereby if one of the index wheels is in an intermediate position, it will be displaced either forward or rearward depending upon the meshing of the first and second wheels so that the contacts of the index wheel are aligned with the second set of contacts.

Mechanical-type meters, as described above, are susceptible to errors as noted in the U.K. Pat. No. 1,253,826 due to movement of one of their index wheels while being accessed. In addition, the contacts of such index wheels are subject to corrosion and other contamination to an extent that the interrogation may indicate that more than one contact of the index wheel appears to be closed. In particular, corrosion may cause a circuit to be completed, not only between the wiper arm and one contact, but also between more than one contact. In the same vein, corrosion may also prevent the completion of a circuit from the wiper arm to any of the plurality of contacts. The Kullmann et al. patent '287 suggests the use of an error checking logic circuit that is coupled to the output of their four decade switches and serves to detect any presence of that condition where no circuit is completed between the wiper arm of a decade switch and any of the plurality of its contacts. Kullmann et al. suggest that a particular error code be generated and transmitted to their interrogator unit. However, the meter transponders of the prior art have not provided any warning signals indicative of the short circuiting or closing of more than one contact with its wiper arm.

SUMMARY OF THE INVENTION

In accordance with these and other objects of this invention, there is disclosed a utility data gathering system comprising a register including a series of index members coupled to a meter mechanism. Each index member includes a plurality of contacts and a switch arm moveable with its index member. The meter mechanism is responsive to utility consumption for moving the index members to positions indicative of the utility consumed, whereby each switch arm completes in normal operation a circuit with just one of its plurality of contacts dependent upon the position of its index member. A digital computer is programmed for performing first and second scans of each contact of each index member to obtain corresponding first and second sets of data indicative of a completed circuit through the switch arm and contacts of each index member. The completed circuit data obtained from each of the first and second scans are compared and if the circuit data of the first and second scans are different, an alarm manifestation is generated.

In a further aspect of this invention, the digital computer is programmed to determine that a circuit has been completed through a contact arm and to provide a first contact closure manifestation indicative thereof. The digital computer comprises a memory having a storage location corresponding to each of the index members. The digital computer is programmed to store an error code in each of the plurality of storage locations, to respond to a first contact closure manifestation indicative of the closure of one contact of one of the index members for accessing the storage location corresponding to the one index member to determine the presence of the error code in the addressed storage location and, if present, to provide an indication that no contacts of the one index member had been previously closed. The digital computer is further programmed to respond to the first contact closure manifestation for erasing the error code as stored in the addressed storage location and for storing therein the first contact closure manifestation indicative of previous contact closure. If a second contact of an index member is closed, the corresponding storage location is addressed to read the previously stored first manifestation, and a fault signal is provided to indicate that two or more contacts of the same index member are closed.

In a further aspect of this invention, the digital computer includes an input terminal coupled to receive an interrogation signal and an output terminal at which is provided a return data signal. The interrogation signal comprises a train of signal burst, each burst having an initiate edge. The digital computer is programmed with a set of instructions for responding to the interrogation signal to access the register to obtain a digital manifestation indicative of the utility consumed, and responsive to each initiate edge of the interrogation signal for applying to the output terminal a unit portion of the digital manifestation. The recurring frequency of the initiate edges of the interrogation signal is set so as not to exceed the capability of the digital computer to execute the program.

The data gathering system further includes a power conversion circuit comprising a storage element. Each pulse of the interrogation signals comprises a signal burst of a relatively high frequency compared with the envelope of that burst. The storage element comprises illustratively a capacitor and a resistor coupled together to permit charging of the capacitor by the interrogation signal. The capacitor and resistor have impedances selected to provide a time constant to permit the rapid charging of the capacitor by a single signal burst. The data gathering system further includes a detection circuit for detecting the envelope of each signal burst and for providing a signal wave form indicative of the envelope and its initiate edge to the input terminal. The detection circuit comprises a filter circuit having a time constant that is relatively small compared to the time constant of the power conversion means for removing from its output the high frequency signal burst.

BRIEF DESCRIPTION OF THE DRAWINGS

These and other objects and advantages of the present invention will become apparent by referring to the following detailed description and accompanying drawings, in which.

DESCRIPTION OF THE PREFERRED EMBODIMENT

Figure 1:
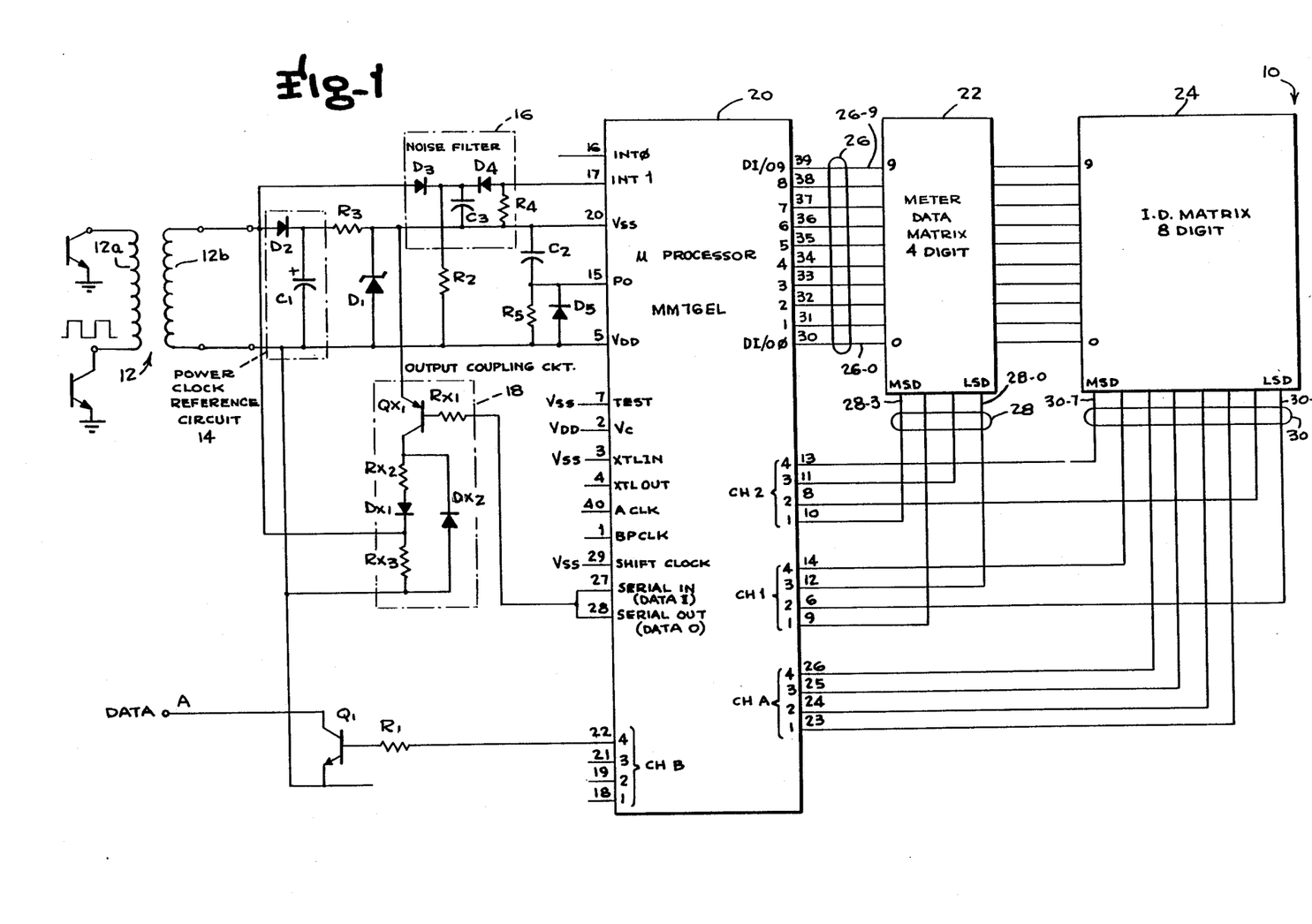
FIG. 1 is a schematic circuit diagram of a transponder unit implemented by a microprocessor programmed in accordance with the teachings of this invention to scan and gather data measured by a utility meter, storing such data and, upon command, transmitting the stored data to a remote interrogation unit (not shown)

With reference to the drawings and, in particular, to FIG. 1, there is shown a meter transponder 10 coupled to a mechanical register or meter data matrix 22 of the type as shown illustratively in the Weinberger et al. patent '904, which illustratively discloses a utility meter of the water type for measuring the flow of water to incrementally record upon a coupled, mechanical-type register, an indication of the amount of water consumed by the customer. As explained above, the mechanical register of the Weinberger et al. patent '904 comprises a series of index wheels indicative of successive magnitudes, e.g., units, tens, hundreds and thousands of the quantity of water consumed. The Weinberger et al. water meter is coupled to a water conduit and upon consumption of a unit of water flow, the first index wheel rotates through a unit incremental arc. For decade-type index wheels, ten unit arcs of rotation represent a complete revolution of the index wheel. Upon completion of a complete revolution, the first wheel causes the second or tens wheel to rotate through an incremental arc. In this fashion, the sets of wheels are capable of accumulating, storing and providing an indication of water flow. Further, each index wheel is associated with a wiper arm and, upon rotation, the wiper arm is disposed in contact with one of a plurality of its contacts, e.g., ten; the wiper arm and contacts form a digit selector switch.

As shown in FIG. 1, a bus 28 comprised of four conductors 28-0 to 28-3 is coupled from the channels 1 and 2 outputs of the microprocessor 20 to corresponding digit selector switches as formed by the four meter wheels of the meter data matrix 22 associated with the utility meter to be interrogated. As will be explained in detail later, the microprocessor 20 under the control of its program selectively reads a signal from one of the conductors of the bus 28, while scanning its outputs DI/09 through DI/0 to identify that output at which one of the selector switches or formed by an index wheel applies the signal inputted to the data matrix 22 on the bus 28. The output at which the signal appears also indicates the degree of rotation of the corresponding index wheel. After one digit selector switch has been scanned, its conductor 28 is de-energized and the next conductor 28 is energized, before the 10 outputs DI/09 through DI/0 are scanned again. It is understood that the conductors 26-0 to 26-9 of the bus 26 are coupled in parallel to the ten contacts of each of the digit selector switches as formed by the corresponding index wheels. By scanning all four digit selector switches, the position of the four wheels and, thus, the measured utility is determined.

In similar fashion, a second bus 30 of eight conductors 30-0 to 30-7 are coupled from channels 1 and 2 of the microprocessor 20 to an ID matrix 24 comprising eight column conductors as coupled to the corresponding conductors of the bus 30 and ten row conductors coupled to corresponding conductors 26-0 to 26-9 of the bus 26. Selected of the row and column conductors of the ID matrix 24 are uniquely connected together to particularly identify the meter associated with the meter transponder 10 and its customer, whereby billing data is identified and billed to that customer.

Figure 3A:
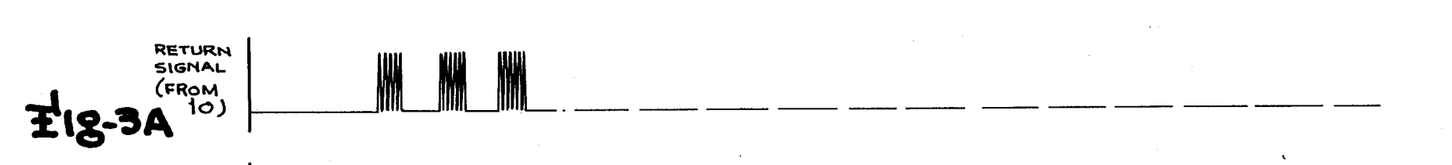
FIGS. 3A, 3B, 3C and 3D show the signals and their wave forms, respectively, of the utility data return signal as transmitted in a second direction from the meter transponder unit of FIG. 1 to the interrogator unit (not shown), the interrogation or power/clock signal as transmitted in a first direction from the interrogator unit to the meter transponder, the data out signal as developed by the microprocessor shown in FIG. 1 comprising a serial train of bits representing a sequence of characters indicative of the consumed utility count and the customer or ID manifestation, and the output of a fast noise filter, as shown in FIG. 1, whose negative going edges synchronize the data out signal developed by the microprocessor.
Figures 3B, 3C:
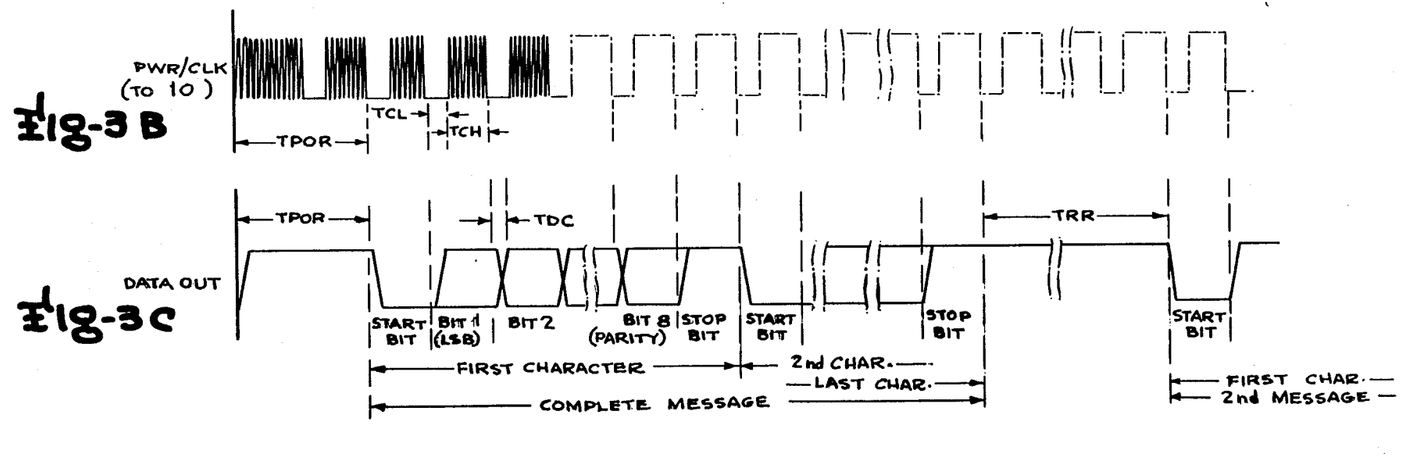

The meter transponder 10 is coupled by an inductive coupling in the form of a transformer 12 to a portable interrogator unit 11 represented by a pair of driving transistors 13. The transformer 12 includes a primary winding 12a as coupled to the interrogator unit 11 and, in particular, to the driving transistors 13. The transformer 12 includes a secondary winding 12b coupled to the meter transponder 10. The interrogator unit 11 suggested in FIG. 1 may illustratively be of the type fully disclosed in co-pending application entitled INDUCTIVE COUPLING SYSTEM FOR THE BI-DIRECTIONAL TRANSMISSION OF DIGITAL DATA, filed in the name of Felice Sciulli on June 20, 1983 and awarded Ser. No. 505,032. As disclosed, the interrogator unit 11 transmits an interrogation or power/clock signal, as shown in FIG. 3B, in a first direction from the interrogator unit 11 to the meter transponder 10 and, in particular, to a power/clock reference circuit 14, which functions to detect the square wave envelope of the interrogation signal to clock the functions of the meter transponder 10 and to energize the circuit elements thereof, as will be explained in detail. The interrogation signal actuates the meter transponder 10 to access or scan the meter data matrix 22, whereby an indication of the consumed utility, e.g., gallons of water measured by the meter, is determined and transmitted in a second direction from the meter transponder 10 to the interrogator unit 11. The manifestation of the consumed utility is the utility data return signal, which comprises a series of high frequency signal bursts indicative of a sequence of characters, as shown in FIG. 3A. As shown in FIG. 3C, the sequential characters of the utility data return signal are indicative of the consumed utility, as well as the ID indication or number indicative of the transponder 10 and its customer. Typically, the interrogation unit 11 receives, demodulates and stores such data, whereby bills may be subsequently prepared by calculating the cost of the consumed utility and directed to that customer as identified by the transmitted ID indication.

Figure 3D:
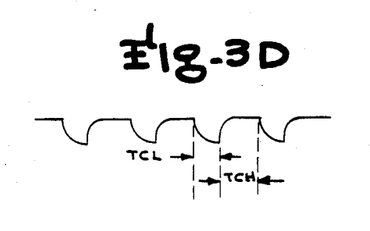

The power/clock reference circuit 14 comprises a rectifying diode D2 and a capacitor C1, whereby a DC voltage is stored upon the capacitor C1 of a level determined by a Zener diode D1. The voltage developed across the Zener diode D1 is applied to the VSS and VDD inputs of the microprocessor 20. In addition, the circuit 14 detects and applies the interrogation signal, as shown in FIG. 3B, to a noise filter circuit 16 comprised of diode D3, capacitor C3, diode D4 and resistor R4. The output of the noise filter 16 resembles the wave form, as shown in FIG. 3D, and essentially follows the envelope of the interrogation signal, as shown in FIG. 3B. The impedances of capacitor C3 and resistor R4 are selected to have a relatively fast time constant with respect of the carrier wave forming the interrogation signal, as shown in FIG. 3B. Examining the interrogation signal, it is seen to comprise a relatively high frequency carrier signal having a wave form or envelope as indicated by the dotted line of FIG. 3B. The frequency of the modulation of the carrier signal is set to be in the order of 100 to 1000 HZ, which range is selected to permit detection of the negative going edge at the input INT 1 of the microprocessor 20. In particular, the noise filter 16 has a relatively long time constant, whereby the high frequency of the carrier signal is filtered out to provide an output signal essentially following that of the envelope of the interrogation signal, as shown in FIG. 3B.

By contrast, the frequency of the carrier signal within the envelope of the interrogation signal, as shown in FIG. 3B, is selected to permit charging of the capacitor C1 of the power/clock reference circuit 14. The circuit elements D2 and capacitor C1 permit a half-wave rectification and their impedances are determined such that the resulting time constant is relatively low to permit the efficient charging of capacitor C1, whereby a DC voltage is established across the capacitor C1.

The microprocessor 20 uses the negative going edge of the output of the noise filter 16 to clock information and, in particular, to transmit one bit of the data output signal, as derived from the serial output of the microprocessor 10 and as shown in FIG. 3B. The space between the negative and positive going edges of the envelope of the interrogation signal is wide enough to permit the microprocessor 10 to respond to each positive going pulse, thus, permitting the high flux level within the transformer 12 to dissipate and the utility data return signal to be transmitted in the second direction via the transformer 12 from the meter transponder 10 to the interrogator unit 11. Illustratively, a time period of 1 millisecond will permit the flux within the transformer 12 to dissipate to a level that the burst of the pulses may be transmitted efficiently to the secondary winding 12b and inductively coupled to appear upon the primary winding 12a.

As seen in FIGS. 3B and 3C, the microprocessor 20 responds to the negative going edge to generate a 0 or 1 bit and, in particular, to generate the utility data return signal as a burst of a relatively high frequency in the interval. In particular, the presence of a burst of the high frequency signal, typically in the order of 40 KHz, indicates a "0" and its absence a "1". The frequency of the output bursts, as shown in FIG. 3A, is selected to be as high possible in view of the impedance presented by the transformer 12. As shown in FIG. 1, the DATA 0 terminal of the microprocessor 20 is coupled through a resistor RX1 to the base of transistor QX1, whereby the utility data return signal, in the form of a series of signal bursts, as shown in FIG. 3A, is applied to the secondary winding 12b to be inductively coupled during the transmission interval, marked as TCL in FIG. 3B, to be inductively coupled to the primary winding 12a. Data may also be output from channel B of the microprocessor 20 and applied via resistor R1 to the base of transistor Q1, whereby a data output signal appears at terminal A.

The microprocessor 20, in an illustrative embodiment of this invention, may comprise that microprocessor manufactured under the model no. MM 76 EL by the assignee of this invention. Such a microprocessor includes an internal memory (not separately shown in FIG. 1) for storing a program, whereby a response is made to the input interrogation signal to scan the switch contacts of each of the select digit switches or index wheels of the meter data matrix 22, as well as the ten outputs of the ID matrix 24, and to transmit a data output in terms of a train of digital data formatted in a sequence of characters, as shown in FIG. 3C. The program is illustrated in FIG. 4 as a high level flow diagram and step 52 thereof is illustrated in more detail by the relatively low flow diagram of FIG. 5.

Figure 4:
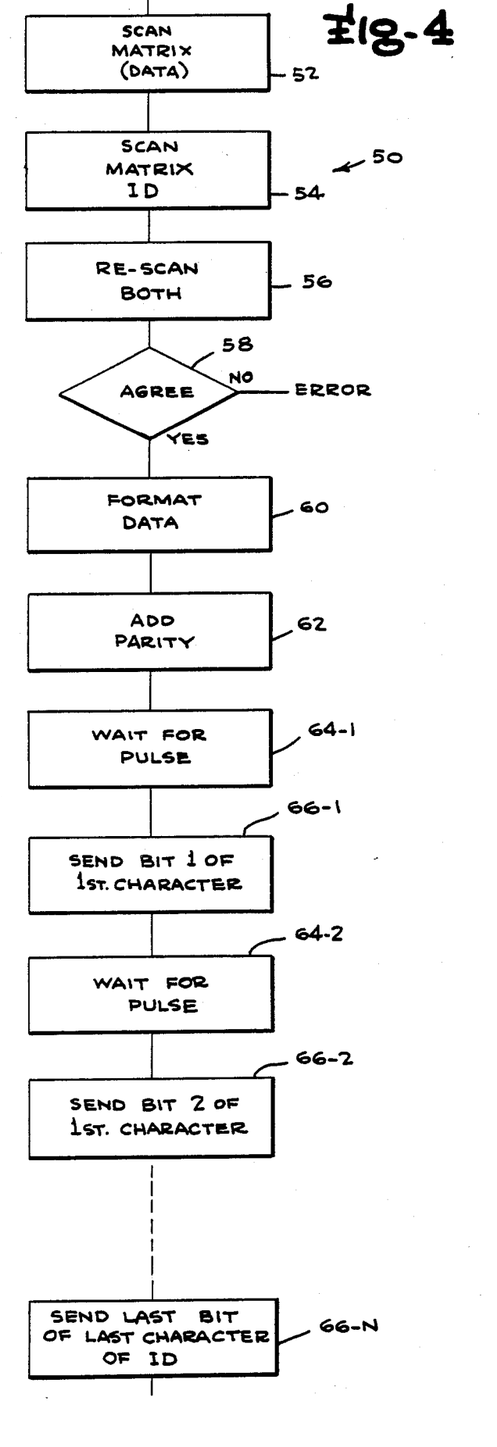
FIG. 4 is a high level flow diagram of the program stored within and executed by the microprocessor of FIG. 1.

Referring now to FIG. 4, the overall operation of the meter transponder 10 will now be explained. Initially in step 52, each of the four select digit switches as comprise the meter data matrix 22 is scanned to output data in terms of the units, tens, hundreds and thousands of the utility measured. As explained above, selected of the outputs of channels 1 and 2 are coupled by conductors forming the bus 28 to the four digit switches of the data matrix 22. Each conductor of the bus 28 is sequentially energized with a high voltage to thereby place that voltage on the wiper arm of the corresponding digit switch. Depending upon the degree of rotation of the corresponding index wheel, that wiper arm completes a circuit through one of its ten contacts; each of the ten contacts are connected to the outputs DI/0 to DI/09 by the conductors of bus 26. As a result, a high signal will be detected at one of the outputs corresponding to which contact of digit switch is mated with the wiper arm and, therefore, the position of the index wheel. In a similar fashion, step 54 scans the ten columns 0 to 9 of the ID matrix 24. Selected of the outputs of channels A, 1 and 2 of the microprocessor 20 are connected by conductors of the bus 30 to the ID matrix 24. As explained above, there is a row conductor of the ID matrix 24 for each of the eight conductors of the bus 30. Each such row conductor is coupled selectively to one of the ten conductors of the bus 26 to thereby uniquely identify its meter. Thus, step 54 begins by placing a high voltage on that conductor 30-0 corresponding to the least significant digit of the ID matrix 24 and, thereafter, scanning sequentially each of the conductors 26-0 through 26-9. After the first scan of the conductors of the bus 26, the high voltage is applied to the conductor 30-1 and again the conductors of the bus 26 are scanned in sequence. In this fashion, there will be eight scans of the conductors of bus 26 with result that each of the eight digits of the ID matrix 24 are identified to provide a unique ID manifestation corresponding to the meter and its customer.

Step 56 repeats the scanning steps 52 and 54, whereby each of the meter data matrix 22 and the ID matrix 24 are again scanned. The data from the first and second scans of the data matrix 22 and the ID matrix 24 are compared in step 58 to determine whether each digit of the first and second scans agree with each other; if not, step 58 indicates that an error condition exists and that a change has occurred between the first and second readings as would occur if at least one of the select digit switches changed its position and, thus, a change of the meter reading. As will be explained, if step 58 does not sense an agreement between these stored sets of data, an error signal will be generated to inform the meter reader that there has been an increment of the consumed utility.

Figure 2:
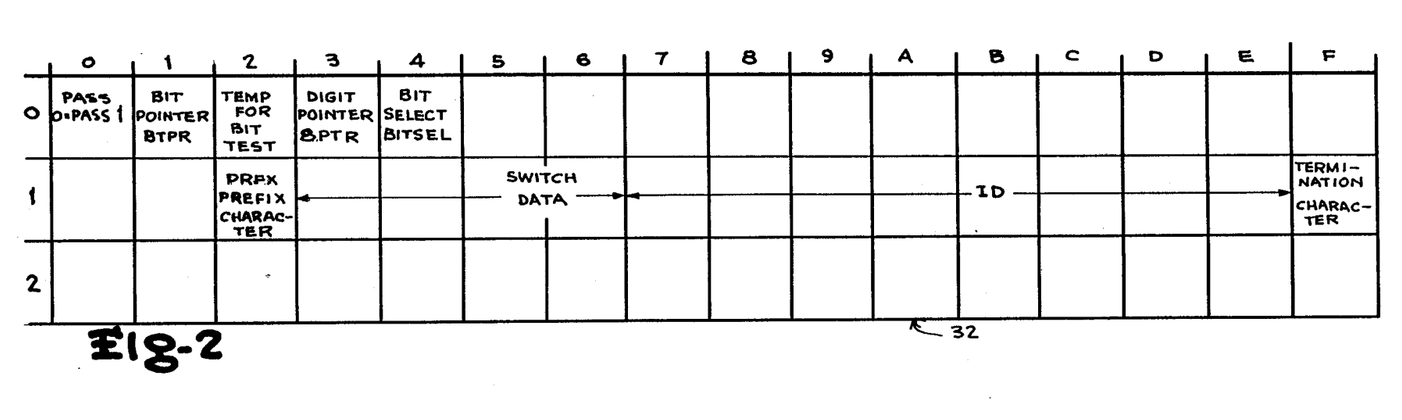
FIG. 2 graphically illustrates the storage locations of a memory as incorporated within the microprocessor shown in FIG. 1.

Referring now to FIG. 2, there is shown graphically the structure of the storage locations of the random access memory (RAM) of the microprocessor 20. The first scan of the data matrix results in four bytes of data indicating the positions of the four register wheels as are stored in locations 3 through 6 of the first row of the RAM. During the second scan, each of the plurality of data bytes resulting from a scan of the conductors of the bus 26, is stored within the bit select location (BITSEL) and is compared with the corresponding byte of the data bytes obtained during the first scan and stored within row 1 of the RAM. If step 58 indicates an agreement, step 60 formats the data into an ASCII format comprised of 7 data bits and an 8th parity bit as shown in FIG. 3C; in addition, a start bit and a stop bit is added at the beginning and end of the 8 bit character. In particular, step 62 examines the 7 bits of data and adds an 8th parity bit.

As shown in FIG. 3B, step 64-1 examines the input INT 1 of the microprocessor 20 and, in particular, senses the negative going edge of the envelope of the interrogation signal, i.e., the output of the fast rise noise filter as seen in FIG. 3D, which indicates the beginning of the transmission interval in which a bit of the utility data return signal is to be transmitted. Upon detection of the negative going edge, step 66-1 transmits the first bit of the first character. Then step 64-2 waits for the next negative edge of the interrogation signal and, upon receipt, step 66-2 sends the second bit of the first character. In this fashion, the program 50 detects successive negative going edges of the interrogation signal to send in sequence each bit of each character up to step 66-N, which transmits the last bit of the last character of the ID.

Figure 5:
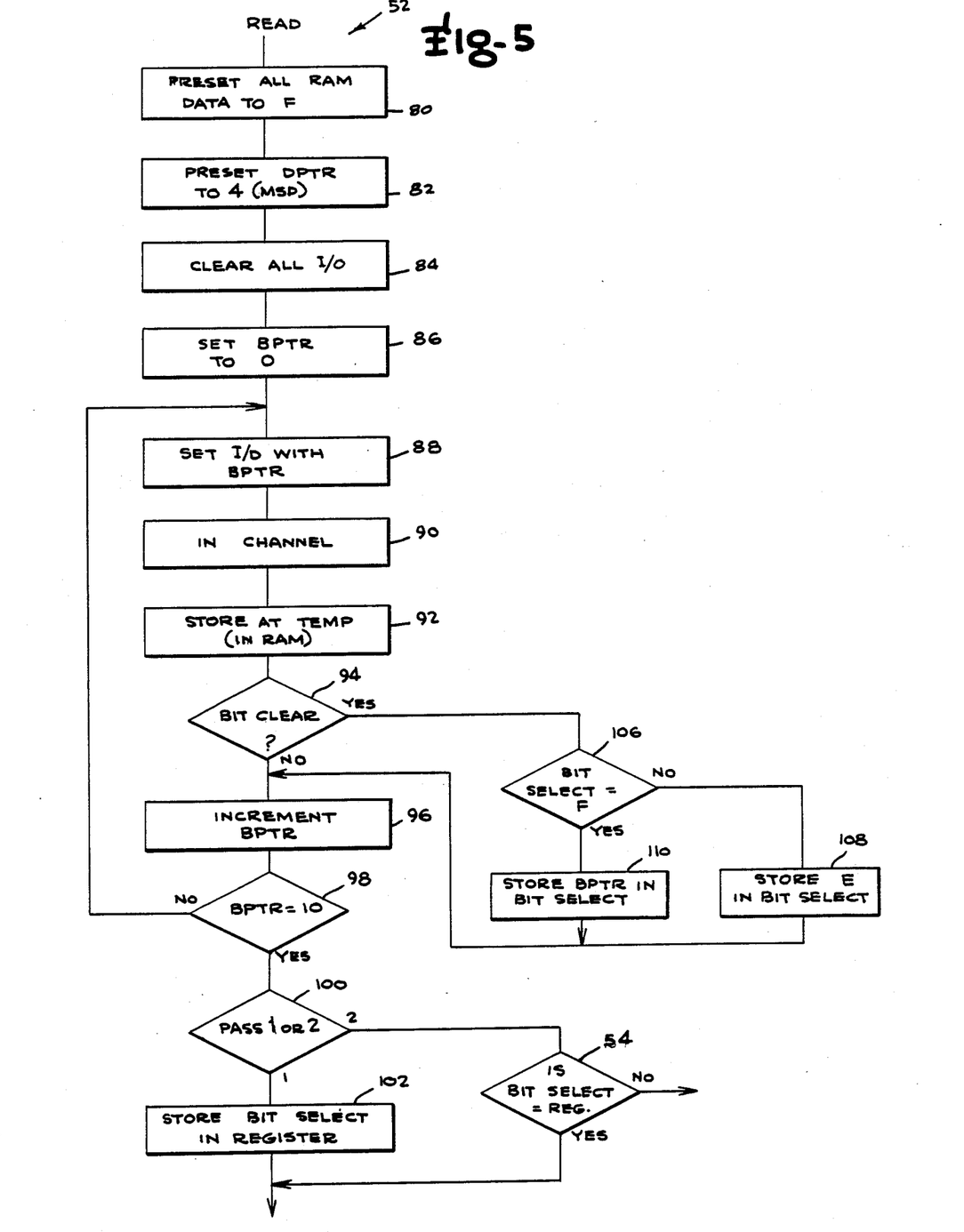
FIG. 5 is a relatively low level flow diagram of the data gathering or meter scanning step generally shown in FIG. 4.

Referring now to FIG. 5, the scanning step or subroutine 52 is more fully explained. In the scanning subroutine 52, step 80 initially sets an error code F in each of the data switch locations of the RAM of the microprocessor 20; in particular, the error code F is set into the four storage locations 4–7 of row one, as shown in FIG. 2. The storing of the error code F, permits a check after the data has been read during either of the first or second scans of the meter data matrix 22 and the ID matrix 24 to determine whether a scan has been completed without the detection that a circuit has been completed through at least one of the wiper arms of the select digit switches of the meter data matrix 22 or through one of the interconnections of the column and row conductors of the ID matrix 24. In either instance, where there has been failure to complete the circuit through the meter data matrix 22 or the ID matrix 24, there is an indication of a malfunction in either element, which may require replacement thereof.

Next, in step 82, the data pointer location BPTR of the RAM, as shown in FIG. 2, is preset to the first location of the selector digit switch data location in the RAM corresponding to the most significant of the four digits of data to be read out from the meter data matrix 22. Next, step 84 clears the outputs DI/O 0 to 9 of the microprocessor 20 and, thereafter, step 86 sets the bit pointer, or more accurately, the bit pointer storage location BTPR as found in the first row of the RAM corresponding to the first of the digit selector switches of the meter data matrix 22; in particular, each of the first select digit switch contacts is coupled to the conductor 26-0 and the bit pointer BPTR access that output DI/O 0 to permit the microprocessor to examine the first switch location. Next, step 88 accesses that output of the outputs DI/O 0 to DI/O 9 as addressed by the bit pointer BPTR, and step 90 transfers that data in the form of a "0" or a "1" as would appear upon the addressed input terminal. More specifically, step 90 places a high or one signal on a selected one of the digital inputs corresponding to one of the conductors of the bus 28 coupled to the meter data matrix 22 to determine whether or not a circuit has been completed via one conductor of the bus 28, the corresponding wiper arm and the addressed input of the outputs DI/O 0 to DI/O 9.

Step 92 transfers the "1" or "0" signal indicative respectively of a completed or open circuit into the temporary storage location of row "0" of the RAM 32. Next, step 94 determines whether the temporarily stored data is a "0" indicating an open or clear circuit or a "1" indicating a closed circuit. If step 94 determines "no" indicating the presence of a "0" and an open circuit, step 96 increments the bit pointer location BPTR, before step 96 determines whether the bit pointer BPTR equals to ten, indicating that each of the inputs DI/0 to DI/9 have been scanned. If the bit pointer BPTR has not reached ten indicating the completion of a single scan of the conductors 26/0 to 26/9 as connected to the data matrix 22 and the ID matrix 24, steps 88 to 96 are repeated, whereby the inputs DI/0 to DI/9 of the microprocessor 20 are again sequentially scanned. When a single scan has been completed, i.e., step 98 indicates a "yes" or that the bit pointer BPTR equals ten, step 100 determines whether the present scan is the first or second pass or scan of the data matrix 22 or the ID matrix 24. If the first scan has not been completed, step 102 transfers the data temporarily stored in the bit select buffer to the switch data locations 3 to 6 of row "1" of the RAM 32. On the other hand, if step 100 indicates a "2" or that the second scan has been completed, step 54 compares the data obtained in the second scan as stored in the temporary select buffer with that data derived during the first scan and stored in the switch data locations 3-6 of row "1". If step 54 determines that there is an agreement, the program returns to step 60 of the main program 50, as shown in FIG. 4. If step 54 indicates a "0", an error signal is generated indicating that a data change or error has occurred between the first and second scans.

Returning now to step 94, as shown in FIG. 5, if step 94 indicates that a clear or "1" signal is sensed indicative of a circuit completion through one of the ID matrix 24 or the data matrix 22, step 106 performs an error check by looking at a storage location of the RAM 32 corresponding to each of the index wheels and its decade switch to determine whether an "F" error code is stored therein. If step 106 determines "yes", there is an indication that the error code "F" has not been erased and that no previous switch closure(s) have been detected. It is understood that the error code will remain in this storage location until erased. In the case where step 106 decides "yes", step 110 stores the bit pointer location BPTR corresponding to the closed contact of the decade switch in the bit selected location of the RAM 30, thereby erasing the error code "F", before returning to step 96. On the other hand, if step 106 should not detect the presence of the error code "F", i.e., the error code "F" has been previously erased indicating that a second switch closure is now detected, step 108 stores an error message "E" in the bit select location, thereby indicating that two or more switch positions are closed. Such an error message indicates the existence of possible contact corrosion or the "hang-up" of the wiper arm of a decade switch between one position and the next, whereby in effect both positions are closed. In such cases, the error message "E" is detected by the microprocessor 20 and may be transmitted in the form of an error message to the interrogator unit 13 so that operator is informed that either the data matrix 22 or the ID matrix 24 should be inspected for possible repair or replacement.

Thus, there has been shown and described above, a transmission system or transmitter unit implemented by a digital computer and, in particular, by a microprocessor for scanning switch contacts to determine which of a plurality of switches has been closed. In an illustrative embodiment of this invention, the transmitter unit is designed to gather data from a utility meter and, in particular, a utility meter comprised of a series of index wheels, the positions of which indicate successive magnitudes of the utility to be metered. Each index wheel has a plurality of contacts and a wiper arm that is moved to contact one of the plurality of contacts, thus, closing a circuit through that contact indicative of the wheel position and of the quantity of utility consumed.

The series of wheels is mechanically coupled to the utility meter and an indication of the accumulated utility is obtained by accessing each of the index wheels to determine which of the contacts is mated with the corresponding wiper arm. In one aspect of this invention, the contacts of the series of index wheels are coupled to outputs of the microprocessor and are sequentially scanned to determine which contact is closed and, therefore, the position of each index wheel and the accumulated utility consumed. The microprocessor is programmed to effect at least first and second scans of the index wheels and also of an identification matrix of rows and columns of conductors selectively connected to each other to uniquely identify the meter and its customer. In addition, an error code is used to determine the closure of a wiper arm with more than one contact of an index wheel indicating a faulty index wheel. In particular, an error code is placed into storage locations corresponding to each index wheel and, upon detection of switch closure, the corresponding contact location is accessed to determine the presence of the error code. If the error code is absent indicating a previous detection of contact closure for that index wheel, a fault manifestation is generated indicating that more than one contact of an index wheel is closed, thus, requiring repair or replacement thereof.

In a further aspect of this invention, the transmitter unit may be solely energized by a combination power/clock signal that is transmitted from an interrogator unit via a coupling mechanism illustratively in the form of a transformer to the transmitter unit, whereby the transmitter unit is actuated to access its series of index wheels to determine the accumulated utility. A message is formulated by the transmitter and is transmitted as a return data signal to the interrogator unit. The transmitter unit is energized solely by the power/clock signal and does not require an external power source or a battery. In particular, there is included a power circuit that is responsive to the power/clock signal to charge a storage element typically in the form of a capacitor, whereby the elements of the transmitter unit including the programmed microprocessor are energized. The power/clock signal comprises a serial train of pulses, each pulse having an initiating edge that is sensed by the microprocessor to initiate the program that formulates and transmits data as the data return signal to the interrogator unit. Illustratively, the train of pulses has a wave form or envelope with the pulse width between a consecutive falling and rising edge thereof selected to be of a sufficient width to permit transmission of a data bit of the return data message within that interval. In addition, the repetitive, initiating edge is selected to appear at a frequency to which the microprocessor may readily respond. The power/clock signal more specifically comprises a serial train of bursts of a relatively high frequency of a carrier signal; the carrier signal is generated with a sufficient high frequency to efficiently charge the capacitor of the power circuit.

In considering this invention, it should be remembered that the present disclosure is illustrative only and the scope of the invention should be determined by the appended claims.

I claim:

1. A utility data gathering system comprising:
   (a) register means including a series of index members, each index member including a plurality of contacts and a switch arm moveable with its index member, and a meter mechanism responsive to utility consumption for disposing said index members to positions indicative of the utility consumed, whereby each switch arm completes in normal operation a circuit with just one of its plurality of contacts dependent upon the position of its index member; and
   (b) utility data gathering means comprising a digital computer programmed for performing first and second scans of each contact of each index nember to obtain corresponding first and second sets of completed circuit data signals, each data signal indicative of whether a circuit is completed through one of said switch arms and one of its contacts, for comparing corresponding ones of said first and second sets of completed circuit data signals obtained from each of said first and second scans, and if said completed circuit data signals of said first and second scans are different, for providing a manifestation indicating that said switch arm has moved due to further utility consumption during the gathering of data.

2. The utility data gathering system as claimed in claim 1, wherein said digital computer is programmed for formatting and transmitting the completed circuit data from each of said index members into a return data signal indicative of the utility consumed, if said first and second sets of data agree.

3. A data gathering system for gathering data indicative of consumption of a utility and for transmitting a signal indicative of the utility consumed, said data gathering system comprising:
   (a) metering means for accumulating data indicative of utility consumed; and
   (b) utility data gathering means implemented by a digital computer comprising an input terminal coupled to receive an interrogation signal and an output terminal at which is provided a return data signal, said interrogation signal comprised of a train of signal bursts, each burst having an initiate edge, memory means for storing a program executed for accessing said metering means to obtain a digital manifestation indicative of the utility consumed, means responsive to selected ones of said initiate edges for executing said program, and data transmission means responsive to each initiate edge of the interrogation signal for applying to said output terminal a unit portion of said digital manifestation, the recurring frequency of said initiate edges of the interrogation signal being compatible with said given rate to permit said executing means to execute said program.

4. The data gathering system as claimed in claim 3, wherein there is included a single inductive coupling means for transmitting the interrogation signal in a first direction therethrough to said input terminal and for transmitting said return data signal in a second direction therethrough, consecutive bursts of said interrogation signal defining a transmission interval for the transmission of said unit portion of said digital manifestation in said second direction, said transmission interval being of a sufficient length to permit said inductive coupling means to permit efficient transmission of said return data signal.

5. The data gathering system as claimed in claim 3, wherein there is included power conversion means for receiving said interrogation signal and for utilizing at least one of said bursts to solely energize said data gathering system.

6. The data gathering system as claimed in claim 5, wherein said power conversion means comprises a storage means and each burst of said interrogation signals comprises a a plurality of pulses of a relatively high frequency compared with an envelope of said burst, said storage means comprising a capacitor and a resistor coupled together to permit charging of said capacitor by said interrogation signal, said capacitor and said resistor having impedances selected to provide a time constant to permit the rapid charging of said capacitor by said signal burst.

7. A method of accessing and gathering data from a meter register, said meter register comprising a series of index members, each index member including a plurality of contacts and a switch arm moveable with its index member, and a meter mechanism responsive to utility consumption for disposing said index members to positions indicative of the utility consumed, whereby each switch arm completes in normal operation a circuit with just one of its plurality of contacts dependent upon the position of its index member, said method comprising the steps of:

(a) performing first and second data scans of said meter register, each of said first and second scans includes applying sequentially an electrical signal to said switch arm of each of said index members and scanning each of said plurality of contacts to determine the presence of said signal and, therefore, a completed circuit through said switch arm and said one contact to obtain respectively first and second sets of completed circuit data signals, each completed circuit data signal indicative of a closed circuit through one of said switch arms and one of said contacts of said one switch arm; and (b) comparing corresponding ones of the completed circuit data signals obtained from each of said first and second scans to provide a manifestation indicative that said switch arm has moved due to further utility consumption during the data gathering.

8. The method of accessing and gathering utility data as claimed in claim 7, further comprising the step of providing an manifestation if said completed circuit data signals of said first and second scans are different.

9. The method of accessing and gathering utility data as claimed in claim 8, further comprising the step of determining whether the completed circuit signals of the first and second scans agree and, if so, for formatting and transmitting the completed circuit signals from each of said index members into a return data signal indicative of the utility consumed.

10. A utility data gathering system comprising:
(a) register means comprising an index member including a plurality of contacts and a movable switch arm, and a meter mechanism responsive to utility consumption for disposing said switch arm to a position indicative of the utility consumed, whereby said switch arm completes in normal operation a circuit with just one of its plurality of contacts; and
(b) utility data gathering means comprising means for scanning each contact of said index member to obtain a corresponding plurality of completed circuit data signals indicative of whether a circuit is completed through said switch arm and one of its contacts, and means for examining said plurality of completed circuit data signals to determine the presence of at least two of said completed circuit data signals indicative of two closed circuits for providing a first warning manifestation indicative thereof.

11. The utility data gathering system as claimed in claim 10, wherein said utility data gathering means comprises means for examining said plurality of completed circuit data signals to determine the absence of any of said completed circuit data signals indicative of no circuit closure for providing a second warning manifestation indicative thereof.

12. The utility data gathering system as claimed in claim 10, wherein said utility data gathering means comprises scanning means for performing first and second scans of each of said plurality of contacts to obtain corresponding first and second sets of said completed circuit data signals, and means for comparing corresponding ones of said first and second sets of completed circuit data signals and for providing a third warning manifestation if said completed circuit data signals of said first and second sets are different indicating that said switch arm has moved due to further utility consumption.

13. The utility data gathering system as claimed in claim 12, wherein said utility data gathering means comprising a memory, means for storing in the course of each of said first and second scans a code manifestation in said memory, means responsive to the first occurring circuit closure data signal for accessing said memory and storing in place of said code manifestation a single completed circuit manifestation indicative that a circuit had been completed through one of said plurality of contacts.

14. The utility data gathering system as claimed in claim 13, wherein said utility data gathering means comprises means for detecting a second occurring completed circuit data signal with a single scan for accessing said memory to detect said single completed circuit manifestation to provide a twice completed circuit manifestation indicative of two closed circuits through two of said plurality of contacts.

15. The utility data gathering system as claimed in claim 13, wherein said utility data gathering means comprises means responsive to the completion of a scan of said plurality of contacts for accessing said memory and, if said code manifestation is present, to provide said second warning manifestation indicative of no closed circuits.

16. A utility data gathering system comprising:
(a) register means including a series of index members, each index member including a plurality of contacts and a switch arm moveable with its index member, and a meter mechanism responsive to utility consumption for disposing said index members to positions indicative of the utility consumed, whereby each switch arm completed in normal operation a circuit with just one of its plurality of contacts dependent upon the position of its index member; and
(b) utility data gathering means comprising a digital computer programmed for performing first and second scans of each contact of each index member to obtain corresponding first and second sets of completed circuit data signals, each data signal indicative of whether a circuit is completed through one of said switch arms and one of its contacts, for comparing said corresponding ones of said first and second sets of completed circuit data signals obtained from each of said first and second scans, and if said completed circuit data signals of said first and second sets are different, for providing a first manifestation indicating that said switch arm has moved due to further utility consumption;

(c) said digital computer comprises a memory having a storage location corresponding to each of said index members, and said digital computer is programmed to store in the course of each of said first and second scans an error code in each of said plurality of storage locations, responsive to one of said completed circuit data signals indicative of the closure of one contact of one of said index members to access said storage location corresponding to said one index member to determine the presence of said error code in said addressed storage location and, if present, to provide a second manifestation indicative that no contacts of said one index member had been previously closed during the current scan.

17. The utility data gathering system as claimed in claim 16, wherein said digital computer is programmed to respond to said one contact closure data signal for erasing said error code as stored in said addressed storage location and for storing therein a third manifestation indicative of previous contact closure of a corresponding one index member.

18. The utility data gathering system as claimed in claim 17, wherein said digital computer is programmed to respond to a second received contact closure data signal for accessing said storage location corresponding to said one index member, and responsive to the storage therein of said third manifestation for providing a fault signal indicative that two or more contacts of said one index member are closed.

19. A method of accessing and gathering data from a meter register, said meter register comprising a series of index members, each index member including a plurality of contacts and a switch arm moveable with its index member, and a meter mechanism responsive to utility consumption for disposing said index members to positions indicative of the utility consumed, whereby each switch arm completes in normal operation a circuit with just one of its plurality of contacts dependent upon the position of its index member, said method comprising the steps of:

(a) performing first and second data scans of said meter register, each of said first and second scans includes applying sequentially an electrical signal to said switch arm of each of said index members and scanning each of said plurality of contacts to determine the presence of said signal and, therefore, a completed circuit through said switch arm and said one contact to obtain respectively first and second sets of completed circuit data signals, each completed circuit data signal indicative of a closed circuit through one of said switch arms and one of said plurality of contacts of said one switch arm;

(b) comparing corresponding ones of the completed circuit data signals obtained from each of said first and second scans and, if they do not agree, providing a first manifestation indicative that said switch arm has moved due to further utility consumption;

(c) storing an error code in the course of each of said first and second scans in a storage location for each of said index members of said register; and (d) detecting the presence of said closed circuit data signal corresponding to one of said index members to determine the presence of said error code in said corresponding storage location and, if present, for providing a second manifestation indicative of a first contact closure for said one index member during the current scan.

20. The method of accessing and gathering utility data as claimed in claim 19 wherein upon detection of the first occurring contact closure data signal, erasing the error code stored in said corresponding storage location.

21. The method of accessing and gathering utility data as claimed in claim 20, wherein the storage location is again accessed upon the detection of a second occurring contact closure data signal for one of said index members and, in the absence of said error code, generating a fault signal indicative that two or more contacts of said one index member are closed.

22. A data gathering system for gathering data indicative of consumption of an utility and for transmitting a return data signal indicative of the utility consumed, said data gathering system comprising:

(a) metering means for accumulating digital data indicative of utility consumed;

(b) utility data gathering means implemented by a digital computer comprising an input terminal coupled to receive an interrogation signal and an output terminal at which is provided said return data signal, said interrogation signal comprised of a train of signal bursts, each signal burst comprised of a plurality of pulses of a relatively high frequency compared to that of said signal bursts and an envelope, memory means for storing a program executed for accessing said metering means to obtain said digital data indicative of consumed utility, means for executing said program at a given rate, and data transmission means responsive to each of said envelopes of said interrogation signal for applying to said output terminal a unit portion of said digital data to provide said return data signal, the frequency of said signal bursts of said interrogation signal being compatible with said given rate to permit said executing means to execute said program;

(c) a single inductive coupling means for transmitting said interrogation signal in a first direction therethrough to said input terminal and for transmitting said return data signal in a second, opposite direction therethrough, consecutive signal bursts of said interrogation signal defining a transmission interval for the transmission of said unit portion of said digital data as a part of said return data signal;

(d) power conversion means for receiving said interrogation signal and for utilizing at least one of said signal bursts to solely energize said data gathering system, said power conversion means comprises a storage means comprising a capacitor and a resistor coupled together to permit charging of said capacitor by said signal bursts, said capacitor and said resistor having impedences selected to provide a time constant to permit the rapid charging of said capacitor by said signal burst; and (e) detection means for detecting said envelope of each signal burst and for providing a signal wave form indicative of said envelope and its initiate edge to said input terminal.

23. The data gathering system as claimed in claim 22, wherein said detection means comprises a filter circuit having a time constant that is relatively long compared to said time constant of said power conversion means for removing from its output said high frequency signal bursts.

* * * * *